B. F. GRAGG.
HOSE COUPLING.
APPLICATION FILED JULY 14, 1917.
1,290,974. Patented Jan. 14, 1919.
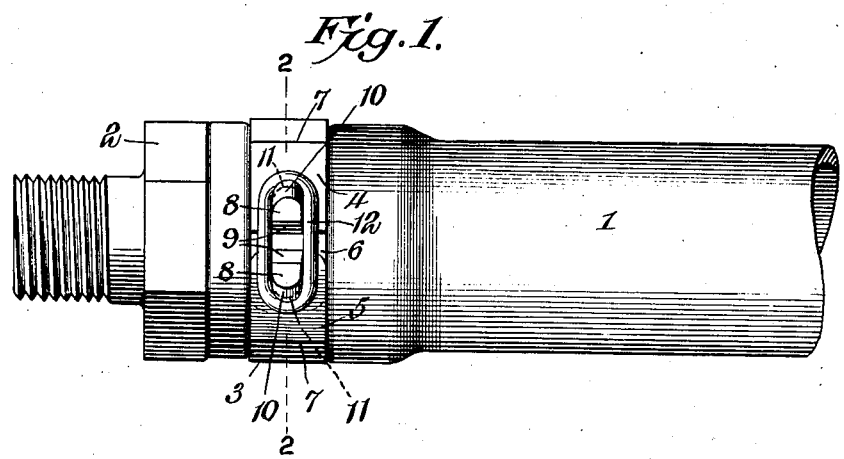
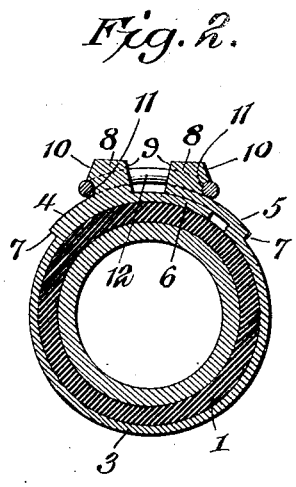 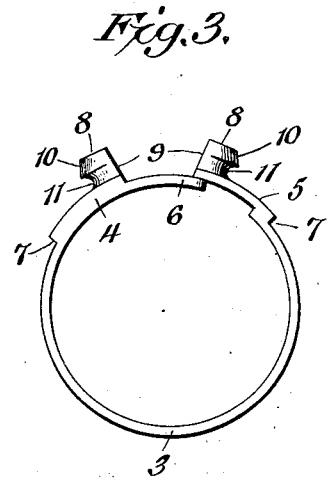
WITNESSES
Howard D. Orr.
H. T. Chapman
B. F. Gragg,
INVENTOR,
BY
E. G. Siggers.
ATTORNEY

UNITED STATES PATENT OFFICE.

BENJAMINE F. GRAGG, OF LOUISVILLE, KENTUCKY, ASSIGNOR OF ONE-HALF TO JULIAN R. FISHER, OF LOUISVILLE, KENTUCKY.

HOSE-COUPLING.

1,290,974.

Specification of Letters Patent.

Patented Jan. 14, 1919.

Application filed July 14, 1917. Serial No. 180,576.

*To all whom it may concern:*

Be it known that I, BENJAMINE F. GRAGG, a citizen of the United States, residing at Louisville, in the county of Jefferson and State of Kentucky, have invented a new and useful Hose-Coupling, of which the following is a specification.

This invention has reference to hose couplings and is designed more particularly for use in connection with train line and signal hose and the like.

For fastening the hose on connections of railway air brakes, the usual arrangement is to provide a clamping or fastening band extending about the hose where it encircles the usual connection at the end of the hose, the band being provided at the ends with ears through which there is passed a bolt. With such an arrangement when it becomes necessary to replace the hose, the band may be reused, but it becomes necessary to cut the bolt to remove it, since the threaded nut becomes rusted or otherwise so securely attached to the bolt that it cannot be removed. The result is that the bolt is lost.

In this invention the ears at the ends of the band are replaced by lugs peculiarly shaped so that a link may be applied in such manner as to encircle and join the lugs and automatically lock into place. When it becomes necessary to replace the hose the link is readily removable and both the band and link may be reused. This results in a saving in material and time and consequently the hose connection is more economical than the customary arrangement both in original manufacture and in application and removal.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a plan view of one end of a piece of hose with a connection applied thereto and held in place by a band embodying the invention.

Fig. 2 is a section on the line 2—2 of Fig. 1.

Fig. 3 is an edge view of the band in the expanded condition.

Referring to the drawings there is shown a small section 1 of hose, which may be taken as typical of signal or train line hose as used in railway brakes. There is also shown a connection 2, such as is customarily used with the hose 1.

Applied to the hose 1 about the connection 2 so as to clamp the hose and connection together, is a band 3 having extremities 4, 5, respectively, so made as to overlap, as is customary in the clamping bands of hose. The extremity 4 has a continuation in the form of a tongue 6, while the extremity 5 is sufficiently offset to receive the tongue 6 to prevent pinching of the hose as the ends of the band are brought one toward the other in the clamping operation. Where the extremities 4 and 5 join the body of the band there are formed shoulders 7 which are provided for the purpose of permitting the grasping of the band by a suitable tool or machine to bring the band in tight encircling engagement with the hose after the latter receives the connection 2, so as to facilitate the application of fastening means holding the band in the clamping position. On each extremity 4 and 5 of the band there is produced a lug 8 extending in a substantially radial direction away from the axis of the band considering the latter as encircling the hose. Each lug 8 has a face 9 toward the other lug substantially radial to the axis of the band, while the opposite face 10 of each lug tapers from the base of the lug toward the outer end thereof, and is rounded so as to be more or less convex. At the base of each lug there is produced a groove 11 conforming generally in curvature to the convexity of the face 10, so as to facilitate the application of a link 12, which latter constitutes the means for holding the band in the clamping position.

The lugs 8 are somewhat elongated circumferentially of the band and are narrower than the width of the band, and may be made considerably narrower than the extent of the lugs circumferentially of the band. The link 12 is made to conform to the width of the lugs and is of a length to hold the band in firm encircling relation to the hose when the link is seated in the grooves 11.

The band 3 is placed around the end of the hose 1, the connection 2 is inserted, and then, by means of a compressed air machine such as is customarily used in the application of clamping bands to the connection ends of train line and signal hose, the band is tightly placed in encircling relation to the hose, the machine engaging the band at the shoulders 7. This brings the lugs 8 sufficiently close together to permit the link 12 to be applied to the lugs, the rounded and beveled or tapered faces 10 facilitating the application of the link and guiding it toward the grooves 11 into which the link snaps. On releasing the pressure on the shoulders 7, the elasticity of the compressed hose causes an expansion of the band 3 to the slight extent necessary to firmly seat the link in the grooves 11. No force to which the hose is subjected in use will cause the dislodging of the link since it is only by a purposely directed force causing the lugs 8 to approach sufficiently that the link can be dislodged from the grooves 11 and so the coupling band 3 holds the hose and connections together indefinitely.

When it is desired to remove the coupling from the hose, as when it is necessary to replace the hose on account of wear, or for other reasons, the same machine by which the band was initially compressed upon the hose may be employed to cause the lugs 8 to again approach, whereupon the link 12 is loosened sufficiently to readily be lifted away from the lugs.

When the clamping band is contracted for the purpose of removing the link 12, there is no difficulty at all in removing the link which will readily loosen and may in most instances be removed by hand, no tools at all being necessary. Nor are there any screw threads to become rusted together or jammed in such a way as to necessitate cutting, as in the case of a bolt, with the consequent destruction of the bolt.

What is claimed is:—

A hose clamp comprising a one-piece incomplete ring-shaped band with the adjacent ends each provided with an outstanding lug having the face remote from the adjacent faces of the lugs convexly rounded and slanting from the basic end toward the outer end, the rounded face of the lug having a groove located at the base of the lug and rounded in conformity with said rounded face, and an endless link longer than wide and flattened at the sides, said link being rounded at the ends to seat in the grooves in the outer rounded faces of the lugs in embracing relation to the lugs.

In testimony that I claim the foregoing as my own, I have hereto affixed my signature in the presence of two witnesses.

BENJAMINE F. GRAGG.

Witnesses:
 CHARLES H. HOLLOWAY,
 CARL R. WIGGINTON.